(No Model.) 2 Sheets—Sheet 1.
J. M. ELDER.
CULTIVATOR SPRING.
No. 304,713. Patented Sept. 9, 1884.
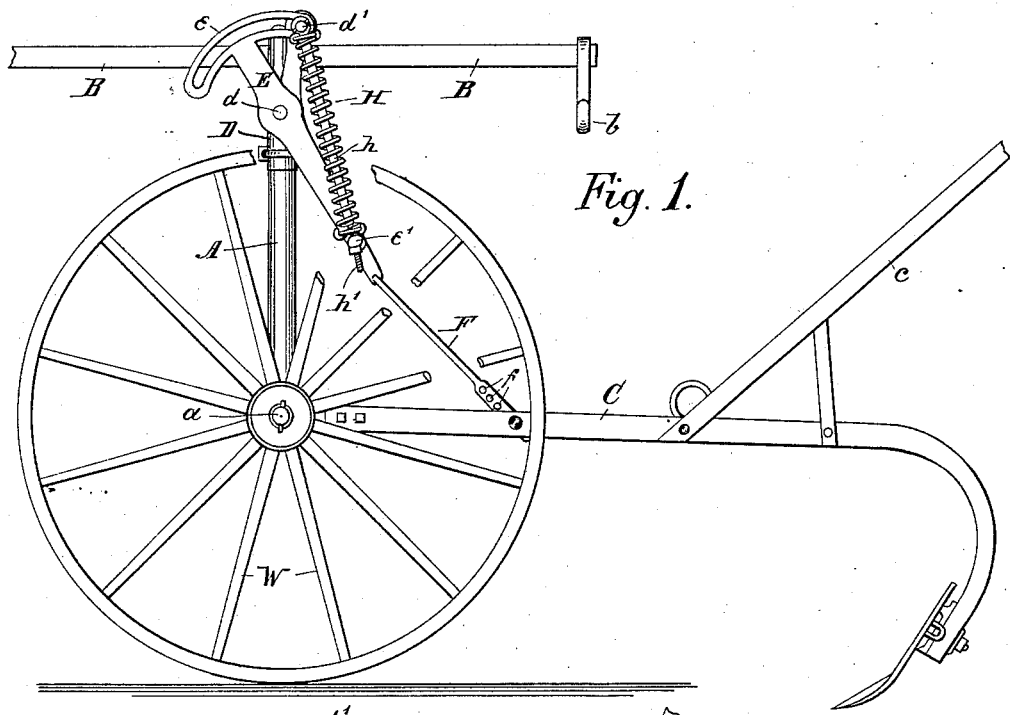
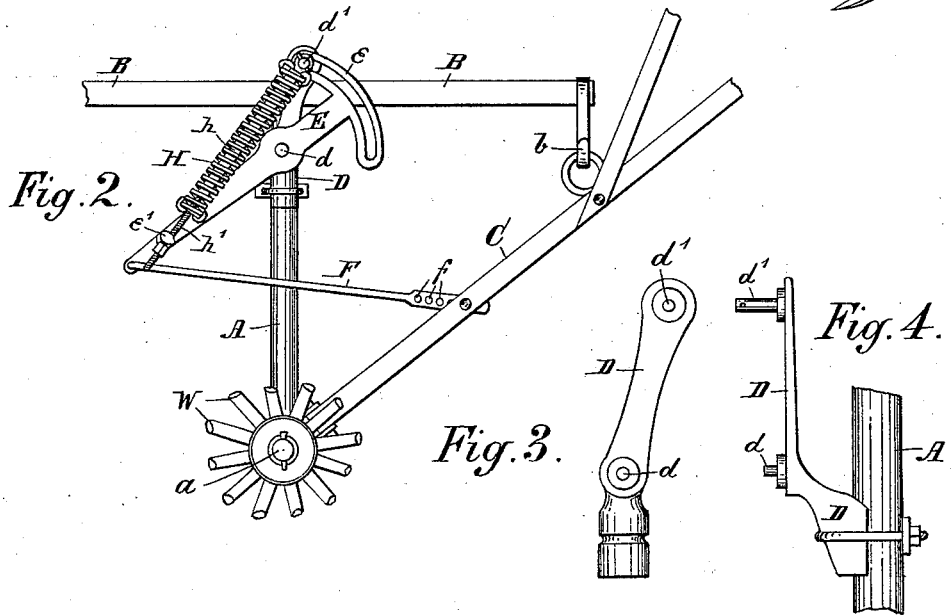
Witnesses:
Chas. Maas.
Gottf. Koehler.
Inventor.
James M. Elder.
Per James B. Lizius & Co.
Attorneys.

(No Model.) 2 Sheets—Sheet 2.
J. M. ELDER.
CULTIVATOR SPRING.
No. 304,713. Patented Sept. 9, 1884.
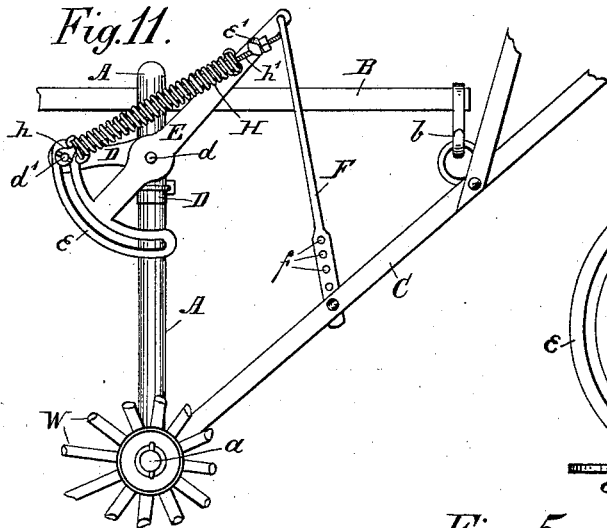
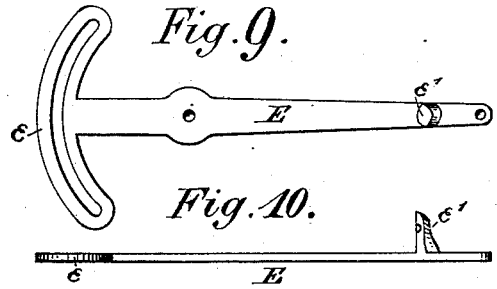
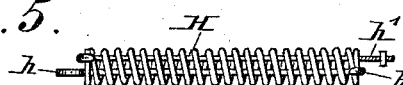
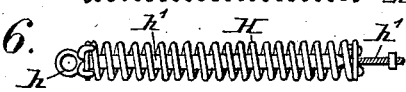
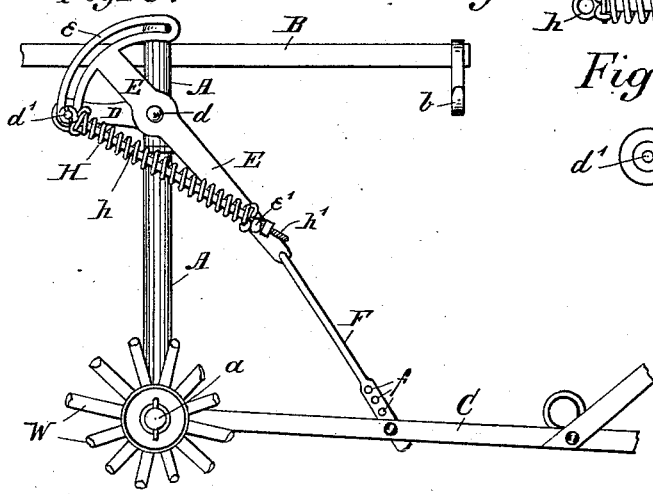
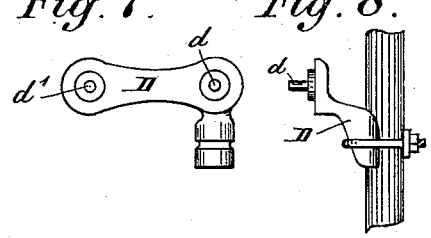
Witnesses:
Chas. Maas.
Gottf. Koehler
Inventor.
James M. Elder.
Per
James B. Lizius & Co.
Attorneys.

UNITED STATES PATENT OFFICE.

JAMES M. ELDER, OF INDIANAPOLIS, INDIANA.

CULTIVATOR-SPRING.

SPECIFICATION forming part of Letters Patent No. 304,713, dated September 9, 1884.

Application filed June 10, 1884. (No model.)

*To all whom it may concern:*

Be it known that I, JAMES M. ELDER, a citizen of the United States, residing at Indianapolis, in the county of Marion and State of Indiana, have invented certain new and useful Improvements in Cultivator-Springs, of which the following is a specification.

My invention relates to improvements in springs such as are used in cultivators, sulky-plows, or the like; and the objects of my improvements are to provide a spring which will force and hold the shovels or plows of the cultivator in the ground when the cultivator is in operation; which will assist the operator in raising and hanging up the plow-beams when not to be used; and which, when applied in a certain manner, will take the weight of the tongue off from the horse's neck when the plow-beams are down.

Heretofore springs have been employed which, to a certain extent, forced the shovels into the ground, and assisted in raising them when out of the ground; but no springs have ever been used which accomplished these points fully, and at the same time took the weight of the tongue off the horse's neck when the plows were in the ground. I accomplish this by the device illustrated in the accompanying drawings, in which—

Figure 1 is a side view of a common cultivator and my new spring attachment, showing the spring forcing the shovels into the ground and holding the arch supporting the tongue in a vertical position, and the tongue secured thereto in a horizontal position, so that the weight of the tongue does not rest on the horse's neck. Fig. 2 shows the shovels raised out of the ground and hung up. Figs. 3 and 4 are detail drawings of the bracket to which the spring-lever is attached; Figs. 5 and 6, details of the spring and the spring-rods; Figs. 9 and 10, details of the spring-lever. Figs. 11 and 12 show a different way of attaching my spring to the cultivator, but when attached so the spring will only force the plow-beams down, and assist in raising them without relieving the horses from the weight of the tongue. Figs. 7 and 8 show details of the bracket needed in case only so much is to be accomplished by the spring.

Similar letters refer to similar parts throughout the several views.

A is the arched yoke of a common cultivator, to which is secured the tongue B. The rear end of the tongue B is provided with a hook, *b*, to hook up into the plow-beams C C. The wheels W W operate around the axle *a*, on which is rigidly mounted the arch A.

To the axle *a* are gimbal-jointed in the usual way the plow-beams C C, depending from the axle, and having a vertical and lateral movement, and being raised and lowered by the handles *c c*, bolted to the plow-beams C C.

Rigidly secured to the standards of the arch A are the brackets D, or the brackets may be cast to the standards. The bracket D is provided with a pivot-pin, *d*, and a projecting pin, *d'*, and is shaped and secured to the standard in such a manner that while the pivot-pin *d* is located just opposite the standard A, looking at the same from the side of the machine, the pin *d'* sets back toward the plow-beams. When the bracket is shaped thus the spring will relieve the horses from the weight of the tongue when the shovels are in the ground, while when shaped as shown in Figs. 7, 8, 11, and 12 it will not.

On the pivot-pin *d* turns the lever E, which terminates at one end in the slotted segment *e*, the center point of which is at the pivot-point *d*, or the lever E and the bracket D may be connected by a loose bolt, *d*. The movement of the lever E is guided and confined into certain limits by the pin *d'* on the bracket D, the pin *d'* passing through the slot in the segment *e* and connecting with one end of the spring-rod *h*. Said rod *h* passes through the entire length of the coiled spring H, and is provided with two claws secured or bent over the spring at the other end. Another rod, *h'*, passes through the spring H, having its claws bent over that end of the spring next to the pin *d'*, and being provided with a screw-thread and nut at the other end. The threaded end of this rod passes through a shoulder, *e'*, secured or cast onto the lever E. Thus the spring H is mounted on the rods *h* and *h'* and kept in place by the claws at the ends of these rods, the tension of the spring forcing the two claw-shaped ends of the rods apart.

To increase or decrease the tension of the spring the nut on the end of the rod $h'$ has to be screwed up or loosened. The lever E hinges at its other end to the lifting-rod F, which is bolted or pivoted to the plow-beam C, and is provided with a number of bolt or pivot holes, $f\ f\ f$. By changing the connection of the rod F and the lever E from one of these holes $f\ f$ to another more or less pressure is exerted upon the plows when in the ground.

The device operates as follows: When the plow-beams C C are being raised out of the ground by the handles $c\ c$, the lifting-rod F raises the lower end of the lever E, the lever E turns on the pivot-point $d$, and the slotted segment $e$ slides on the stationary guide-pin $d'$. The claw-shaped ends of the rods $h\ h'$ will draw together and will compress the spring H until they lie right over the lever E and the pivot-point $d$. Then the rods $h\ h'$ and the spring H swinging around to the other side of the pivot-point $d$, the tension of the spring will act on the rods $h\ h'$ and the rod F, and thus assist the operator in raising the plow-beams at a time when otherwise the strain on his shoulders would be most heavy. When the plows are in the ground, the tension of the spring exercises a downward pressure on the plow-beams C and keeps the shovels in the ground, and when the mechanism is attached to the arch-standard A, as shown in Figs. 1, 2, 3, and 4—that is, when the bracket D leans toward the rear, so that the pin $d'$ sets back of the pivot-point $d$ and the arch-standards A, the spring H will take the weight of the tongue B off from the horse's neck when the shovels are in the ground.

What I claim, and desire to secure by Letters Patent, is—

1. In a cultivator or sulky-plow, the combination, with the arch A, the axle $a$, supporting the arch A, the wheels W W, operating on said axle $a$, and the plow-beams C C, gimbal-jointed to the axle $a$, of the bracket D, rigidly secured to the arch-standard A, the pivotal pin or point $d$, and the guide-pin $d'$, both being located on the bracket D, as specified, the lever E, pivoted to the bracket D, the slotted segment $e$ on one end and the shoulder $e'$ near the other end of said lever E, the spring H, the spring-rods $h$ and $h'$, and the rod F, all constructed substantially as described, and for the purpose specified.

2. In a cultivator, the combination, with the arch A, the axle $a$, and the plow-beams C C, hinged to the axle $a$, of the bracket D, secured or cast to the arch A, the lever E, pivoted to the bracket D, the slotted segment end $e$ of said lever E, and the shoulder $e'$, near the other end of the lever E, the pin $d'$, secured to the bracket D, and passing through the slot of the segment $e$, the rod $h$, pivoted at one end to the pin $d'$, passing through the spring H, and being bent at the other end over the spring H, the corresponding rod, $h'$, secured at one end to the spring H, passing through the shoulder $e'$ at the other end, and being held in place by a nut, as described, and the adjustable rod F, hinged to the lever E, and secured to the plow-beams C, all arranged as described, and for the purpose specified.

3. In a spring for the purpose of forcing the shovels of a cultivator or plow into the ground and assisting in raising the same, the combination of the bracket D, secured to the arch of the cultivator, the lever E, pivoted to the bracket D, the slotted segment $e$ at one end of the lever E, the lifting-rod F, secured to the other end of the lever E, the pin $d'$, secured to the bracket D, and passing through the slot of the segment $e$, the rods $h\ h'$, the spring H, and the shoulder $e'$, all constructed and combined as described, and for the purpose specified.

4. In a cultivator or sulky-plow spring, the combination, with the arch A, of the bracket D, secured to the arch A, the pivotal point or pin $d$ on said bracket D, located right in a line with the center of the arch A, the pin $d'$ at the upper end of the bracket D, located back of the pivotal point $d$, and passing through the slotted segment $e$, the lever E, pivoted to the bracket D at $d$, the slotted segment $e$ on one end of said lever D, the adjustable lifting-rod F, secured to the other end of the lever E, the rod $h$, connected at one end to the pin $d'$, the rod $h'$, connected at one end to the lever E by the shoulder $e$, and the spring H, passing over the rods $h$ and $h'$, and being secured at one end to the rod $h$ and at the other to the rod $h'$, all constructed as specified, to accomplish the purpose of taking the weight of the tongue off from the necks of the horses when the plows are in the ground.

In testimony whereof I have signed my name to this specification in the presence of two subscribing witnesses.

JAMES M. ELDER.

Witnesses:
CHARLES MAAS,
GOTTF. KOEHLER.